June 9, 1964
M. J. KITTLER
3,136,717
FUEL FILTER
Filed June 13, 1960
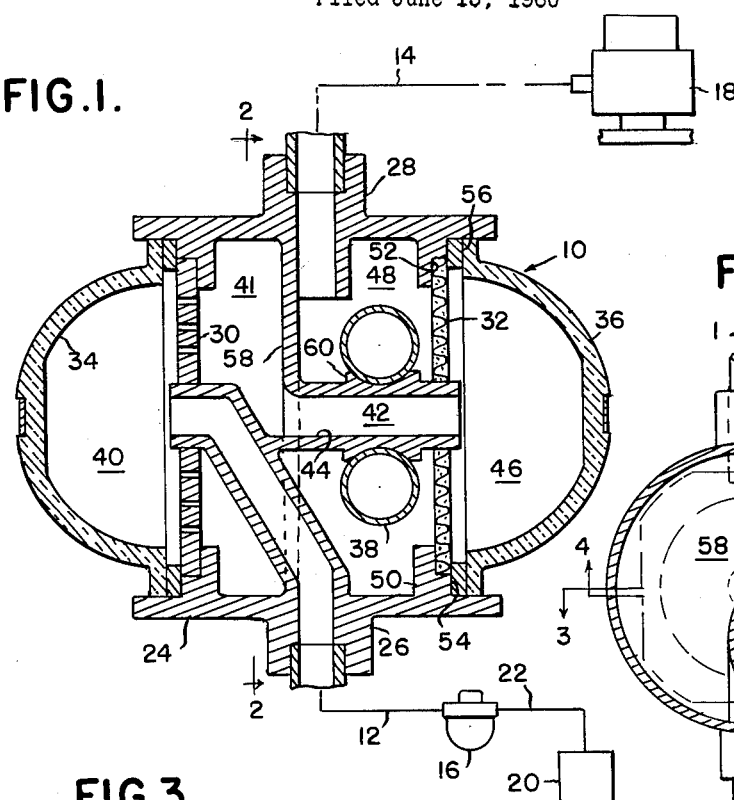
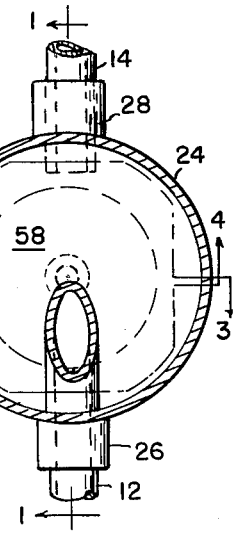
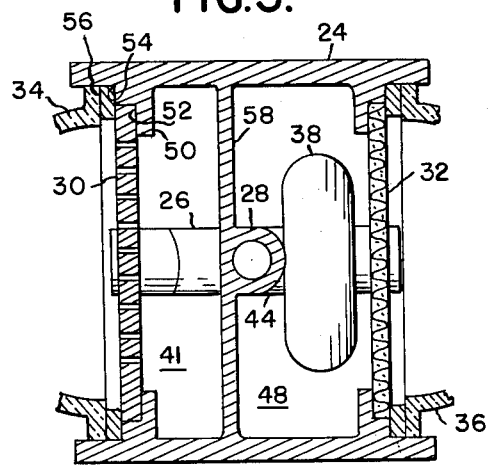
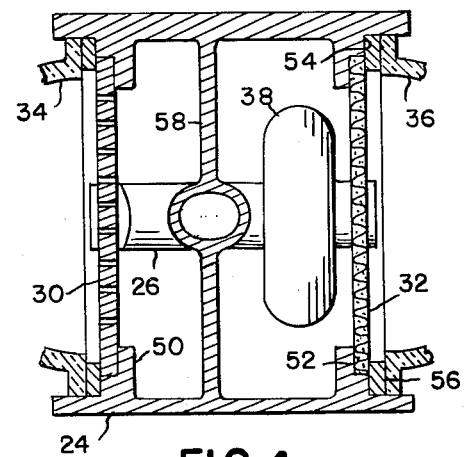
INVENTOR.
MILTON J. KITTLER
BY Whittemore
Hulbert & Belknap
ATTORNEYS

United States Patent Office 3,136,717
Patented June 9, 1964

3,136,717
FUEL FILTER
Milton J. Kittler, Bloomfield Hills, Mich., assignor to Holley Carburetor Company, Van Dyke, Mich., a corporation of Michigan
Filed June 13, 1960, Ser. No. 35,770
9 Claims. (Cl. 210—95)

The present invention relates generally to fuel filters and refers more particularly to an improved two-stage fuel filter structure.

In the past placing of filters in fuel lines either before or after the fuel passes through a fuel pump has been known. The main reason for a filter in a fuel line is to remove dirt particles which can cause a float-operated fuel inlet valve in a carburetor to stick open and cause the carburetor to flood. Usually such filters have been of single stage construction, that is to say contain a single filter element.

Two-stage filters have also been known in the past, that is to say filters including two filter elements are not unknown. Prior filters containing two filter elements often have not spaced the filter elements and so supported them that fuel passing through a two-stage filter did not pass through both filter elements thereof. This latter objection to prior two-stage filters has been particularly true with filters wherein one of the filter elements is magnetic.

Further the two-stage filters of the past have usually been difficult to service due to the positioning of the filter elements thereof directly in a fuel line. Also many of the two-stage filters of the past have provided no way by which the filter elements could be inspected to indicate whether the elements needed servicing without removing them.

It is therefore one of the objects of the present invention to provide improved two-stage fuel filter structure including a pair of spaced apart filter elements one of which is magnetic in a preferred embodiment.

Another object is to provide a fuel filter including a pair of spaced apart filter elements and means for observing the installed filter elements so that it may be easily determined when the elements need service.

Another object is to provide a fuel filter including a pair of spaced apart filter elements which fuel filter is constructed to permit easy removal of the filter element for servicing.

More specifically it is a purpose to provide a fuel filter comprising a housing having an inlet and outlet conduit secured thereto adapted to be connected in a fuel line, a pair of filters secured to said housing in spaced relation to each other and a cover mounted over each of said filters whereby separate inlet, outlet and fuel transfer chambers are provided within the fuel filter to produce a two-stage fuel filter structure.

Still more specifically it is a purpose to provide a generally cylindrical fuel filter housing including means for connecting an inlet and an outlet conduit thereto substantially centrally thereof longitudinally and also including a centrally located internal partition therein whereby the housing is separated into separate chambers, a filter member over each end of said housing, an extension of the inlet conduit extending outward through one end of said housing through one of said filters, a fuel transfer conduit extending between the partition and the other of said filters, and transparent dome shaped covers placed over said filters whereby fuel entering the filter through the inlet conduit is first transferred into an inlet chamber formed between the first of said filters and one of said covers, thence passes into a fuel transfer chamber formed by said one of said filters, the partition, the conduit between the partition and the other of the filters, the other of said filters, and the other of the covers, and thence out through the second of said filters into an outlet chamber between the other of the filters and the partition and into the outlet conduit to provide two-stage fuel filtering.

Another object is to provide a two-stage fuel filter as set forth above wherein means are provided to smooth the output of fuel from the fuel filter which fuel is fed in surges to the fuel filter.

Another object is to provide a two-stage fuel filter structure as set forth above including an annular hollow flexible member filled with a compressible substance positioned about the conduit extending between the partition and said other filter whereby on surging of fuel through said other filter into the outlet chamber between said other filter and partition the compressible substance is compressed and later expands during periods when fuel does not surge through said second filter whereby output of fuel through the outlet conduit from the outlet chamber is maintained relatively steady due to alternate expansion and contraction of the compressible material.

Another object is to provide a two-stage fuel filter which is simple in structure, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a cross-sectional view of a two-stage fuel filter according to the invention taken on the line 1—1 in FIGURE 2.

FIGURE 2 is a reduced cross-sectional view of the fuel filter illustrated in FIGURE 1 taken on the line 2—2 in FIGURE 1.

FIGURE 3 is a partial cross-sectional view of the fuel filter shown in FIGURE 1 taken on the line 3—3 in FIGURE 2.

FIGURE 4 is a partial cross-sectional view of the fuel filter shown in FIGURE 1 taken on the line 4—4 in FIGURE 2.

With particular reference to the drawings a specific embodiment of the two-stage fuel filter of the invention will now be described.

As shown best in FIGURE 1 the two-stage fuel filter 10 is adapted to be connected between fuel lines 12 and 14 which as shown extend between the fuel filter 10 and fuel pump 16 and between the fuel filter 10 and a carburetor 18 respectively. A fuel tank 20 is illustrated connected to fuel pump 16 by means of fuel line 22.

Fuel filter 10 comprises housing 24 having inlet and outlet conduits 26 and 28 respectively secured thereto, filters 30 and 32 and covers 34 and 36 positioned with respect to housing 24 as illustrated. Fuel filter 10 further includes the cushion member 38 located within housing 24 as shown best in FIGURE 1.

In operation fuel from fuel pump 10 is pumped through conduit 26 into the chamber 40 provided by cover 34, from which it passes through filter 30 into fuel transfer chamber 42. The fuel then passes through filter 32 into outlet chamber 48 from which it subsequently passes out of filter 10 through conduit 28. Cushioning member 38 serves to dampen surges of fuel through the filter 10.

More specifically housing 24 is a generally cylindrical member as shown best in FIGURES 1 and 2. Radially inwardly extending flanges 50 are provided at each end of the cylindrical housing 24 as shown. The flanges 50 are provided with an annular recess 52 in the axially outer surface thereof which are adapted to receive the filters 30 and 32 as shown. Flanges 50 further provide abutment surfaces 54 against which annular seals 56 are seated.

Housing 24 is further provided with a transversely extending partition 58 located centrally thereof as shown best in FIGURE 1. Partition 58 divides the housing 24 into a part 41 of fuel transfer chamber 42 and a fuel outlet chamber 48. Fuel transfer conduit 44 is secured to partition 58 radially centrally thereof as shown in FIGURE 1 and serves to transfer fuel between the parts 41 and 46 of the fuel transfer chamber 42.

The housing 24 also includes the inlet and outlet conduits 26 and 28 respectively as shown. The inlet conduit 26 is adapted to be connected to the fuel line 12 from the fuel pump 16 and extends through the partition 58 and filter 30 to discharge fuel from fuel line 12 directly into chamber 40 formed by cover 34 in conjunction with filter 30. Outlet conduit 28 extends between the fuel discharge chamber 48 formed by filter 32 and partition 58, and fuel line 14 leading to carburetor 18 as indicated in FIGURE 1.

Filters 30 and 32 as shown are substantially flat annular shaped members and are seated about their radially outer periphery in recess 52 provided in flanges 50 in housing 24 as previously indicated. It will be understood that the material from which these filters are constructed may vary in accordance with the filtering requirements of a particular installation and fuel.

As shown filter 32 is intended to be a mesh type filter capable of transmitting fluid therethrough while collecting solid particles of foreign matter in the fuel which are larger than a predetermined size. Filter 30 as indicated comprises a perforated or sintered permanent magnet and serves to remove finely divided magnetic oxides and other small metal particles which may be present in the fuel before the fuel is passed through filter 30. The magnetic filter 30 is preferably first with respect to fuel flow through the fuel filter 10 so as to prevent the filter 32 from being loaded with filterable material which could be removed by the magnetic filter element.

Covers 34 and 36 are positioned over the ends of housing 24 and are sealed thereto by means of seals 56. Covers 34 and 36 may be of transparent material such as plastic or glass and may be held in position on housing 24 by convenient readily removable means such as bail assemblies attached to the housing 24 or threads acting between the covers 34 and 36 and the housing 24 or the like.

The cushion means 38 comprises a flexible hollow doughnut shaped outer covering surrounding fuel transfer conduit 44 and filled with compressible gas, such as air or the like. The cushion member 38 is positioned axially of the conduit 44 on formed seat 60 integral with conduit 44 as illustrated in FIGURE 1. The cushion member is compressed during surges of fuel through filter 32 from part 46 of chamber 42 into fuel outlet chamber 48 and expands when the pressure of the fuel surging into chamber 48 is reduced whereby the cushion member 38 tends to maintain the fuel output through output conduit 28 at a more constant pressure than it would otherwise be.

In over-all operation fuel which it is desired to filter is pumped from tank 20 through fuel lines 22 and 12 by fuel pump 16 and into inlet conduit 26 of the fuel filter 10. The fuel is then conveyed through inlet conduit 26 into chamber 40 provided between cover 34 and fuel filter 30 as previously indicated.

The fuel in chamber 40 is then passed through filter 30 under pressure from the fuel pump 16 whereby small particles of magnetic foreign matter are removed from the fuel as it passes from chamber 40 into the part 41 of fuel transfer chamber 42 formed between the filter 30 and the partition 58 of housing 24. Still under pressure of the fuel pump 16 the fuel in part 41 of chamber 42 passes through fuel transfer conduit 44 and into the part 46 of chamber 42 provided between the filter 32 and the transparent covering 36.

The fuel is then passed through porous filter 32 whereby particles of a size above a predetermined maximum size contained in the fuel which may pass filter 30 are removed therefrom as the fuel enters fuel discharge chamber 48.

The fuel thus twice filtered still under the influence of the pressure created by fuel pump 16 is then passed through outlet conduit 28 and fuel line 14 to carburetor 18.

As indicated above the cushioning means 38 will cause the flow of fuel from outlet conduit 28 to be relatively smooth in comparison to the flow of fuel from pump 16 due to the compression of the cushion member 38 on surges of fuel into the chamber 48 and expansion of the member 38 under relatively low fuel pressures.

Thus it will be seen that according to the invention there is provided a fuel filter 10 which is simple in construction, economical to manufacture and efficient in use. Particularly it will be noted that means are provided in the fuel filter 10 whereby the filtered fuel may be inspected in part 46 of chamber 42 through transparent cover 36 and whereby both filters 30 and 32 may be inspected through the covers 34 and 36 so that it may be readily determined when servicing of the filters is required. Also, it will be obvious that the covers 34 and 36 of the fuel filter 10 may be easily removed and replaced to provide access to filters 30 and 32 which may also be easily removed and replaced during servicing without disconnecting the filter 10 from the fuel line.

The drawings and the foregoing specification constitute a description of the improved two-stage fuel filter in such full, clear, concise and exact terms as to enable any person skilled in the art to practice the invention, the scope of which is indicated by the appended claims.

What I claim as my invention is:

1. A fuel filter comprising a cylindrical housing, a cover removably secured to said housing at each end of said housing, a filter member at each end of said housing extending transversely across said cylinder and intermediate the covers, a transverse partition in said housing intermediate the filter members, an inlet conduit extending through the side wall of said housing and through one of said filter members through which fuel may be passed into the inlet chamber formed by said one filter member and the cover adjacent thereto, a transfer conduit extending through said partition and the other of said filter members whereby the volumes defined by said one filter member, partition and housing and by the other filter member and the cover adjacent thereto form a single transfer chamber, and an outlet conduit extending out through the side wall of said housing from the outlet chamber formed by said partition, other filter member, and housing.

2. A fuel filter as set forth in claim 1 wherein said covers are dome shaped and convex outwardly of said fuel filter whereby chambers are formed between said filter members and covers.

3. A fuel filter as set forth in claim 1 wherein said other filter member is porous to prevent particles above a maximum size from passing therethrough and wherein said one filter member is a permanent magnet.

4. A fuel filter as set forth in claim 1 and further including a hollow doughnut shaped member of elastic material surrounding the transfer conduit and filled with compressible material for dampening surges of fuel through said fuel filter.

5. A fuel filter comprising a cylindrical housing having a transverse central partition therein, a magnetic filter extending transversely of said housing completely across one end thereof, a second filter having a porosity to prevent particles above a predetermined size from passing therethrough extending transversely of said housing completely across the other end thereof, a separate transparent fuel bowl secured over the filter at each end of the housing, a transfer conduit extending between the center of the transverse partition and the center of said second filter, an inlet conduit extending transversely into the housing between the transverse partition and said second filter, obliquely through the transverse partition and perpendicularly through the center of the magnetic filter, an outlet conduit extending out of said housing between the transverse partition and the second filter opposite the inlet conduit and a hollow doughnut shaped member of elastic material surrounding the transfer conduit and filled with compressible material for dampening surges of fuel through said fuel filter.

6. A fuel filter comprising a cylindrical housing having a transverse central partition therein, a magnetic filter extending transversely of said housing completely across one end thereof, a second filter having a porosity to prevent particles above a predetermined size from passing therethrough extending transversely of said housing completely across the other end thereof, a separate transparent fuel bowl secured over the filter at each end of the housing, a transfer conduit extending between the center of the transverse partition and the center of said second filter, an inlet conduit extending transversely into the housing between the transverse partition and said second filter, obliquely through the transverse partition and perpendicularly through the center of the magnetic filter and an outlet conduit extending out of said housing between the transverse partition and the second filter opposite the inlet conduit.

7. A fuel filter comprising a hollow housing having first and second opposite side walls, a first and second opening extending through the respective first and second opposite side walls, a first and second filter positioned over the respective first and second openings, first and second cup-shaped covers secured to said housing exteriorly thereof over the respective first and second filters whereby first and second end chambers are formed between the respective first and second covers and filters with the housing forming an intermediate chamber between the end chambers, means connected to the first of said end chambers for introducing fuel into said first end chamber, means in the intermediate chamber connected between the first fuel filter and said other end chamber for transferring fuel filtered through the first filter into said second end chamber, means connected to said intermediate chamber for transferring fuel filtered through the second of said filters out of said second end chamber into said intermediate chamber out of said fuel filter and pressure responsive means provided within said intermediate chamber for damping surges of fuel through said filter.

8. A fuel filter comprising a hollow housing having first and second opposite side walls, a first and second opening extending through the respective first and second opposite side walls, a first filter extending over said first opening in said housing, a second filter extending over said second opening in said housing, first and second cup-shaped fuel bowl covers secured to said housing exteriorly thereof over the respective first and second filters whereby first and second end chambers are formed between the respective first and second covers and filters with the housing forming an intermediate chamber between the end chambers providing a compartment for receiving filtered fluid from the first filter, a transverse partition extending completely across said housing within the intermediate chamber between the filters, a fuel inlet conduit extending into the first of the end chambers, a transfer conduit connected to and extending through the transverse partition at one end thereof and extending through the second filter and into the second end chamber at the other end thereof and an outlet conduit extending out of the housing between the transverse partition and the second filter.

9. Structure as set forth in claim 8 wherein said covers are transparent so that accumulated filtered material on both of said filters may be readily viewed without the necessity of removing said covers.

References Cited in the file of this patent

UNITED STATES PATENTS

| | | |
|---|---|---|
| 1,125,485 | Davis | Jan. 19, 1915 |
| 1,807,200 | Dennison et al. | May 26, 1931 |
| 1,845,316 | Michailovsky | Feb. 16, 1932 |
| 2,094,457 | Lattner | Sept. 28, 1937 |
| 2,122,119 | Thibert | June 28, 1938 |
| 2,265,550 | Smith | Dec. 9, 1941 |
| 2,544,289 | Andrews | Mar. 6, 1951 |

FOREIGN PATENTS

| | | |
|---|---|---|
| 272,784 | Great Britain | June 23, 1927 |